(12) United States Patent
Gunther et al.

(10) Patent No.: US 8,278,608 B2
(45) Date of Patent: Oct. 2, 2012

(54) ELECTRICAL HEATER FOR HEATING SUBSTANTIALLY CYLINDRICAL OBJECTS

(75) Inventors: Herbert Gunther, Allendorf (DE); Siegrid Sommer, Burgwald (DE); Frederic Zimmermann, Frankenberg (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 412 days.

(21) Appl. No.: 12/674,224

(22) PCT Filed: Jul. 21, 2008

(86) PCT No.: PCT/EP2008/005939
§ 371 (c)(1),
(2), (4) Date: Feb. 19, 2010

(87) PCT Pub. No.: WO2009/024224
PCT Pub. Date: Feb. 26, 2009

(65) Prior Publication Data
US 2011/0120986 A1    May 26, 2011

(30) Foreign Application Priority Data

Aug. 22, 2007  (DE) .................... 20 2007 011 746 U

(51) Int. Cl.
*H05B 3/02* (2006.01)
*H05B 3/06* (2006.01)
(52) U.S. Cl. .................... 219/546; 219/534; 219/542
(58) Field of Classification Search ............ 219/534, 219/535, 536, 542, 546
See application file for complete search history.

(56) References Cited

U.S. PATENT DOCUMENTS

| 4,990,753 | A | * | 2/1991 | Hollander ................ 219/505 |
| 5,973,296 | A | | 10/1999 | Juliano et al. |
| 6,530,776 | B1 | | 3/2003 | Pilavdzic et al. |
| 7,241,131 | B1 | | 7/2007 | Booth et al. |
| 8,110,783 | B2 | * | 2/2012 | Sasaki et al. ............. 219/544 |
| 2006/0054616 | A1 | | 3/2006 | Ptasienski et al. |
| 2012/0125913 | A1 | * | 5/2012 | Song ....................... 219/546 |

FOREIGN PATENT DOCUMENTS

| DE | 19941038 | 3/2001 |
| DE | 69708218 | 6/2001 |
| DE | 20211328 | 10/2002 |
| DE | 60034019 | 12/2007 |
| NL | 7900927 | 8/1980 |
| WO | 01/47684 A1 | 7/2001 |
| WO | 01/54882 A1 | 8/2001 |
| WO | 01/98054 A1 | 12/2001 |
| WO | 2004/067255 A1 | 8/2004 |
| WO | 2007/008075 A2 | 1/2007 |
| WO | 2007/008075 A3 | 1/2007 |

* cited by examiner

*Primary Examiner* — Hung Vu
(74) *Attorney, Agent, or Firm* — Clark & Brody

(57) ABSTRACT

The present invention relates to an electric heater (22) to heat substantially cylindrical objects (12), in particular hot runner nozzles (10) of hot runner systems, essentially being fitted with at least one cylindrical support and with at least one heating conductor track (28) deposited on the support (12). To reduce premature failure of the heater, the invention stipulates that each heating conductor track (28) runs substantially in the axial direction (A) of said support (12), the heating conductor tracks (28) being connected to each other by conductor tracks (30) of lower electrical resistance and each conductor track (30) running essentially in the tangential direction (T) of the support (12).

22 Claims, 7 Drawing Sheets

ELECTRICAL HEATER FOR HEATING SUBSTANTIALLY CYLINDRICAL OBJECTS

Figure 1:
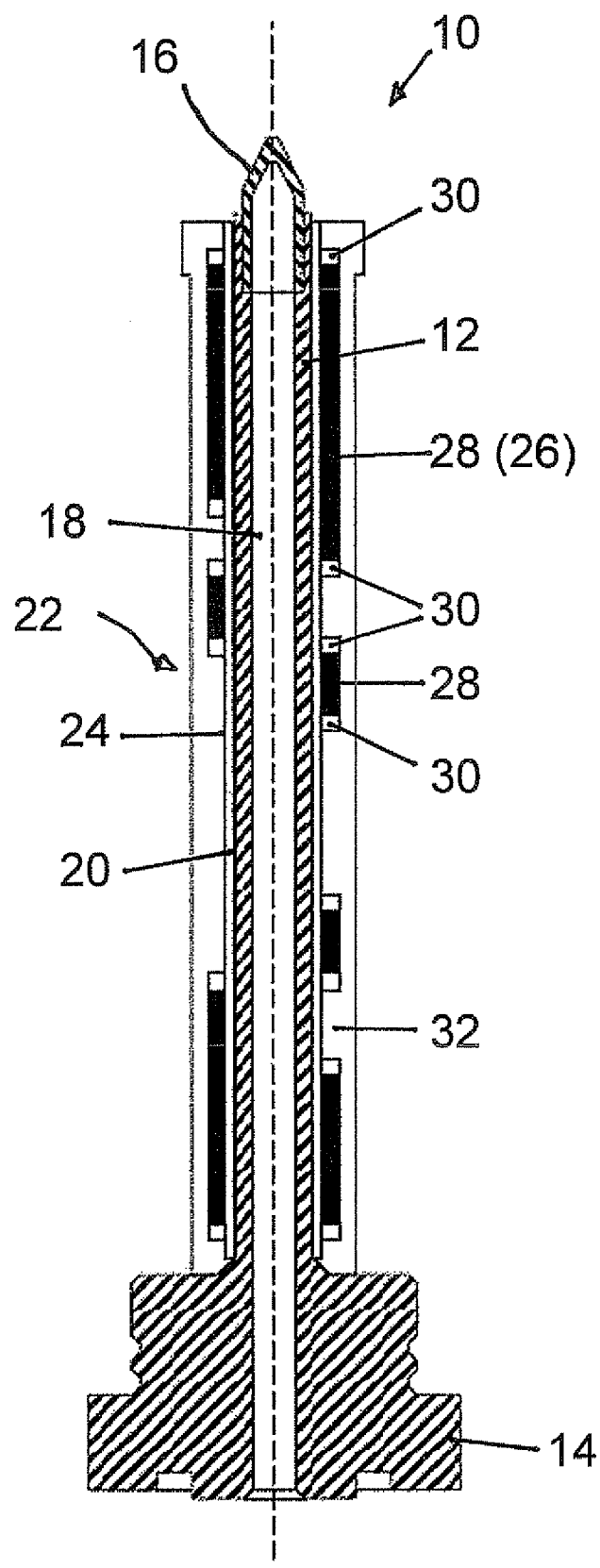

The present invention relates to an electrical heater heating substantially cylindrical objects, in particular hot runner nozzles of hot runner systems, as defined in the preamble of claim 1.

Electrical heaters of the above kind are known in the state of the art. Illustratively the German patent documents DE 199 41 038 A1 discloses a hot runner system heater with which to heat hot runner systems and in the form of a flat thick film, such a heater being fitted with an insulating layer firmly bonded to it and being made up of heating conductor tracks. The heating conductor tracks run in meandering or wavy manner in both the tangential and the axial directions of the feed pipe, the course of the heating conductor tracks being matched to the required local heater respectively to the feed pipe of the material passing through it, that is, the heating conductor tracks are arrayed more tightly one with another in those zones requiring more heat than in zones requiring less heat.

The bonding and stratified deposition of the heater on one hand assures firm connection to the feed pipe wall and hence always optimal thermal contact with the surface of the hot runner element to be heated. On the other hand there is danger that the insulating layer and/or the heating layer shall detach from the feed pipe.

Due to the feed pipe's internal pressure, its wall shall bulge outward during injection molding. This expansion is transmitted to the insulating and heating layers and as a result tensive forces are generated in said layers both in their tangential and axial directions. In this process the heating conductor tracks are under much higher mechanical load in the tangential respectively peripheral direction than the heating conductor tracks running radially, entailing accelerated ageing and hence earlier failure of the tangential heating conductor tracks and hence of the heater as a whole. Moreover the thermal effects of said expansion on the active heating conductor tracks are such that said radial tracks shall be elongated more in the tangential direction than those in the axial direction of the feed pipe, causing a higher electric resistance of the tangential heating conductor track and hence a higher voltage drop across it, and higher power. Thus the tangential heating conductor tracks are heated more and will be at a higher temperature.

Also said expansion may lead to transverse micro-cracks in the tangential heating conductor tracks, again possibly leading to an increase in electrical resistance and local temperature rises. Consequently the electric heater's ageing is accelerated and the temperature function/distribution is adversely affected. Lastly the heating conductor tracks running in the tangential respectively peripheral direction are subjected to forces varying with the radial height, that is the thickness function, of the feed pipe, whereas the forces present in the axial heating conductor tracks remain constant relative to the radial height.

The configuration of the heating conductor tracks is another factor in their locally higher temperatures and leads to premature heater ageing. The heating conductor tracks at the center of such configurations are at higher temperatures due to their ambient power input than the nearby heating conductor tracks and are commensurately more stressed thermally.

The objective of the present invention is to overcome the above cited difficulties and to create an electric heater, a hot runner nozzle and injection molding equipment allowing drastically reducing the causes of premature heater failure, further attaining homogeneous heat distribution at desired positions. Furthermore the heater design shall be based on simple, economic means and assure permanent, reliable operation of the hot runner nozzle respectively the injection molding equipment.

The main features of the present invention are cited in the characterizing portions of the claims 1, 22 and 23. Embodiment modes of the present invention are the objects of claims 2 through 21.

As regards an electric heater to heat substantially cylindrical objects, in particular hot runner nozzles of hot runner systems comprising at least one substantially cylindrical support fitted with at least one deposited heating conductor track, the present invention stipulates that each heating conductor track—namely each track transmitting heat to said object—essentially runs in the axial direction of said support, in that the heating conductor tracks are electrically connected to each other by conductor tracks, each conductor track running essentially in the tangential direction of the support, and the conductor tracks being of a lesser electrical resistance than the heating conductor tracks.

Such a design respectively configuration of the heating conductor tracks allows drastically reducing the causes of failure of stratified electrical heaters. Whereas the heating conductor tracks serve to feed a given quantity of heat to the object to be heated, the conductor tracks do not contribute thereto. These conductor tracks instead serve to connect heating conductor tracks deposited in the axially direction on the feed pipes.

The heating conductor tracks heating the object being arrayed essentially in the axial direction of the support thereby shall be hardly susceptible to load conditions varying during injection molding. On the other hand, the conductor tracks running tangentially respectively in the peripheral direction and connecting the heating conductor tracks, while being stressed more during injection molding, on account of their low electrical resistance are less stressed thermally and thereby withstand unscathed the high mechanical loads. Accordingly the probability of failure of the heater of the present invention is considerably reduced.

In order that the conductor tracks be of lower electric resistance than the heating conductor tracks, the former are made preferably of a material of lower electrical resistivity than are the latter. Alternatively or in addition, the conductor tracks also may be made in a larger cross-section than are the heating conductor tracks. This feature assures that the operational thermal load on the conductor tracks of the heater is less than that on the heating conductor tracks, further assuring compensation of the high mechanical loads that during injection molding act in the axial direction of the support.

The transition sites between the heating conductor tracks and the conductor tracks are preferably arrayed in a manner that the current density in the heating conductor track be homogeneous. For that purpose the transition elements between the heating conductor tracks and the conductor tracks preferably are arrayed at an angle to the axial direction preferably between 0 and 90, even more preferred between 0 and 40°.

In this respect, the particular spacing between neighboring heating conductor tracks is selected preferably using an inhomogeneous power distribution to attain homogeneous heat distribution in the object to be heated. In other words, a heating conductor track situated between two further such tracks is positioned a larger distance away from its neighboring tracks than is a track having only one or no neighboring track at all.

Connecting pads for the heating conductor tracks are used to advantage. The transition sites between the heating conductor tracks and the connecting pads preferably are configured perpendicularly to the axial direction in order to keep the current density distribution homogeneous in this instance too.

The support is preferably tubular, though oval or other non-circular cross-sections also may be used.

In one embodiment of the present invention, said support is a feed pipe or constitutes such. In that case at least one insulating layer is deposited on the support and serves as a substrate for the heating conductor tracks. Said insulating layer may run across the full support. Alternatively it may be configured also only underneath the heating conductor tracks and the electrical conductor tracks, in which case the width of the insulating layer preferably shall exceed the width of the heating conductor tracks and the width of the conductor tracks.

In a further alternative embodiment of the present invention, the said support is sleeve slipped over the feed pipe. The sleeve ma be metallic, in which case an insulating layer is deposited in the above described manner on it in order to insulate tracks and strips from it. Alternatively the sleeve may be ceramic and hence be insulating, in which event the tracks and strips may be deposited directly on it.

The insulating layers and/or the heating conductor tracks and/or the electrical conductor tracks preferably are deposited by bonding/fusing. Such bonding/fusing may be implemented for instance using the thick film technique or laser sintering.

Preferably the insulating layer is made of a dielectric. Its configuration and manufacture re illustratively described in DE 199 41 038 A1, reference being made hereby to its disclosure.

The instantaneous temperature is detected by a temperature sensor which advantageously shall not cross the heating conductor track and/or the electrical conductor tracks.

The present invention moreover relates to a hot runner nozzle fitted with a heater of this invention and to injection molding equipment fitted with at least one such hot runner nozzle.

Further features, particulars and details of the present invention are defined in the claims and discussed in the following description of illustrative embodiment modes in relation to the appended drawings.

Figure 2:
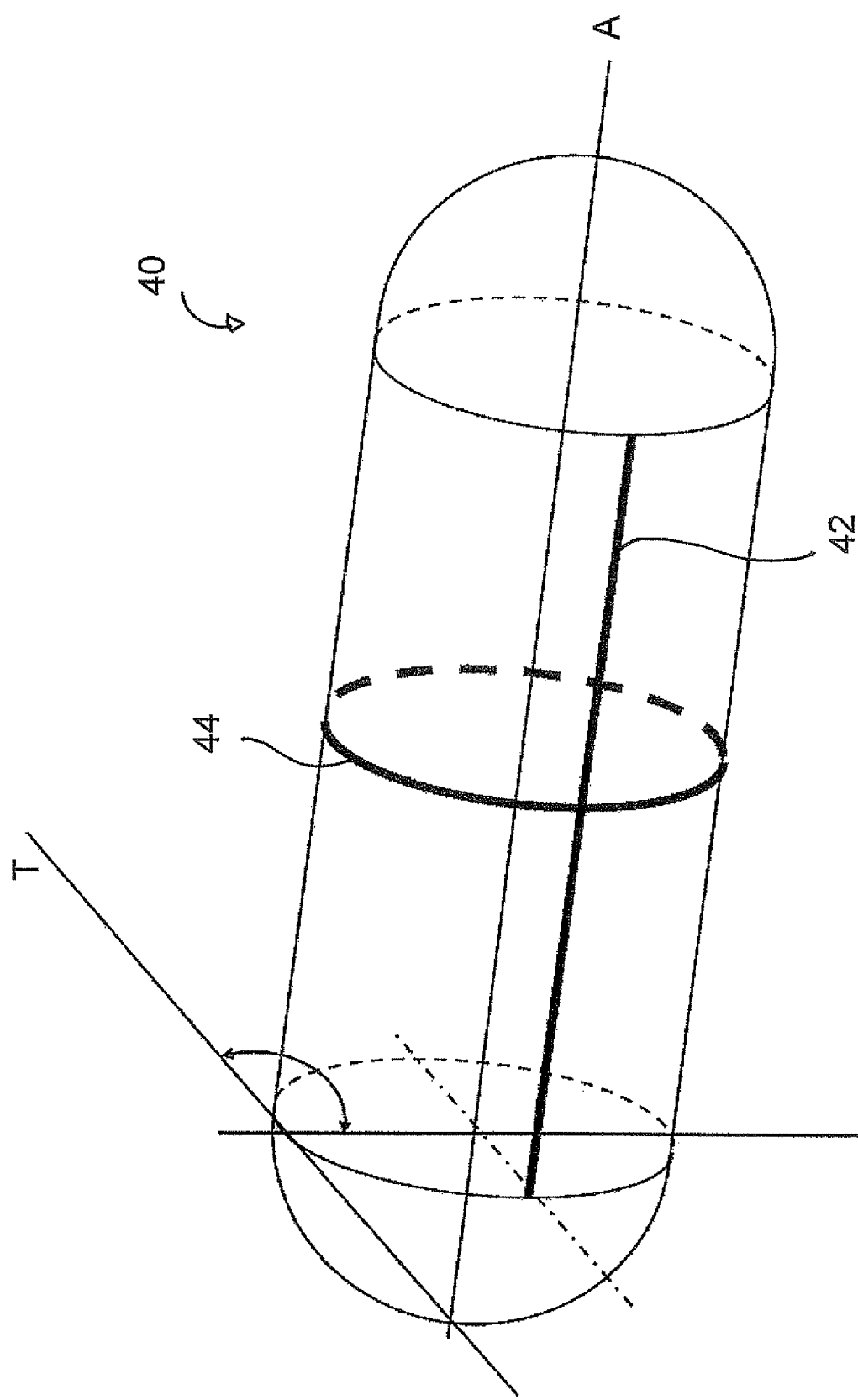
Figure 3:
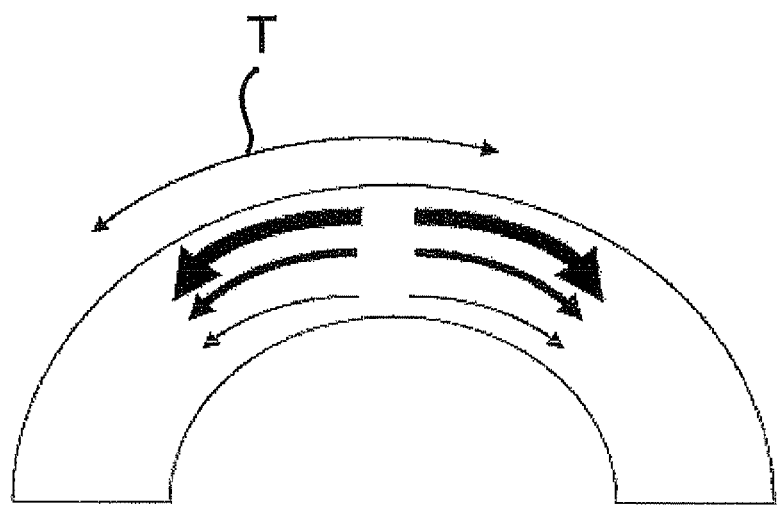
Figure 4:
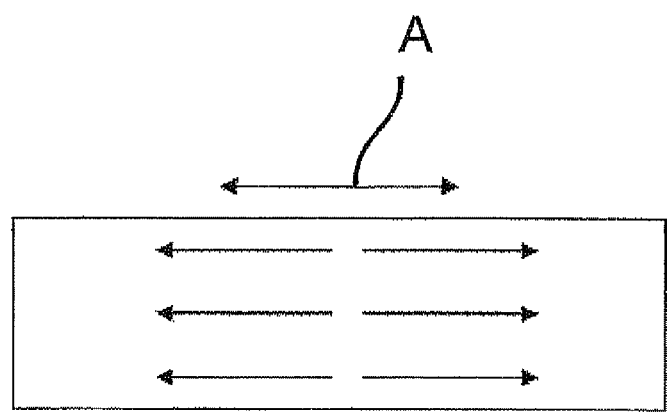
Figure 5:
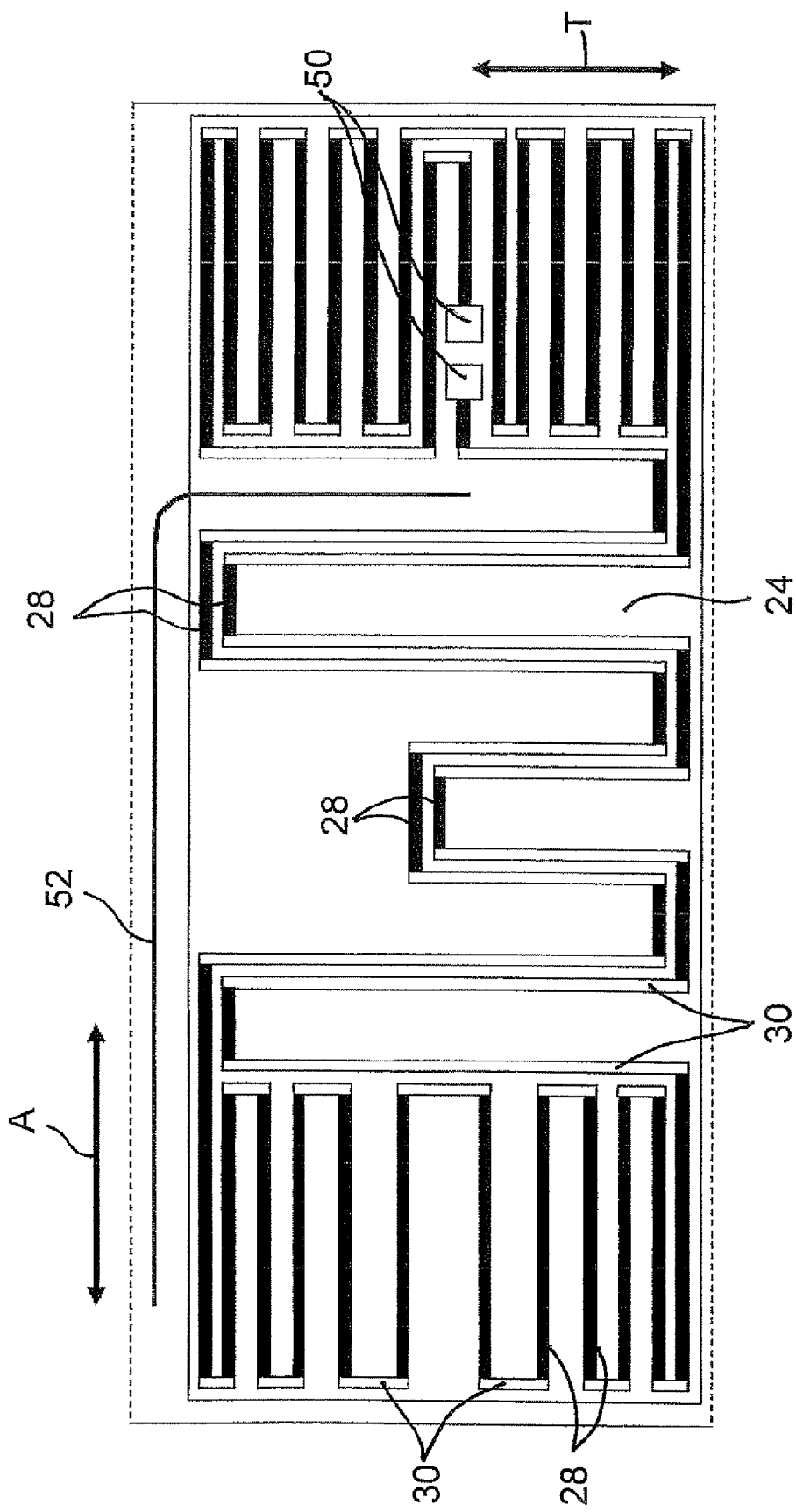
Figure 7:
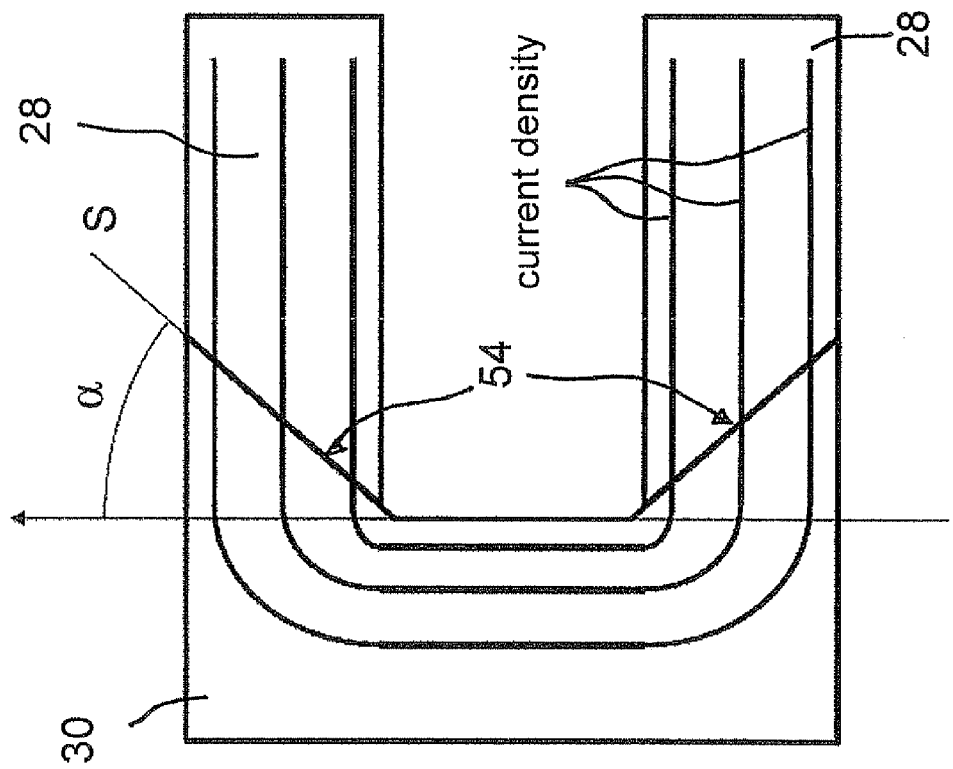
Figure 6:
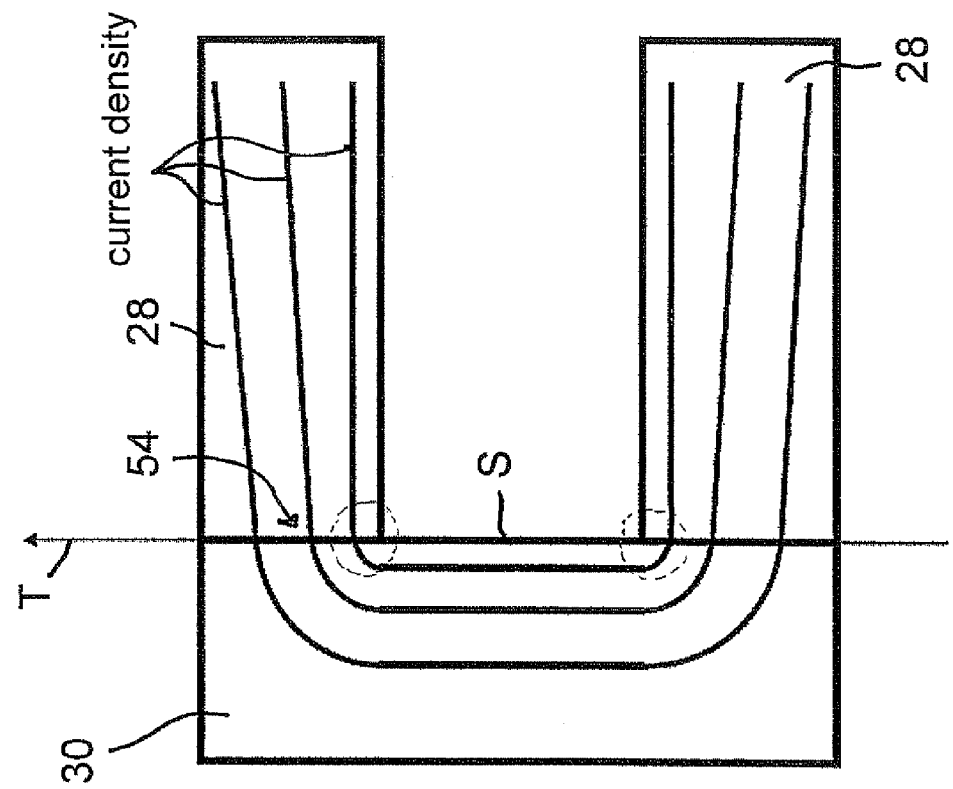
Figure 8:
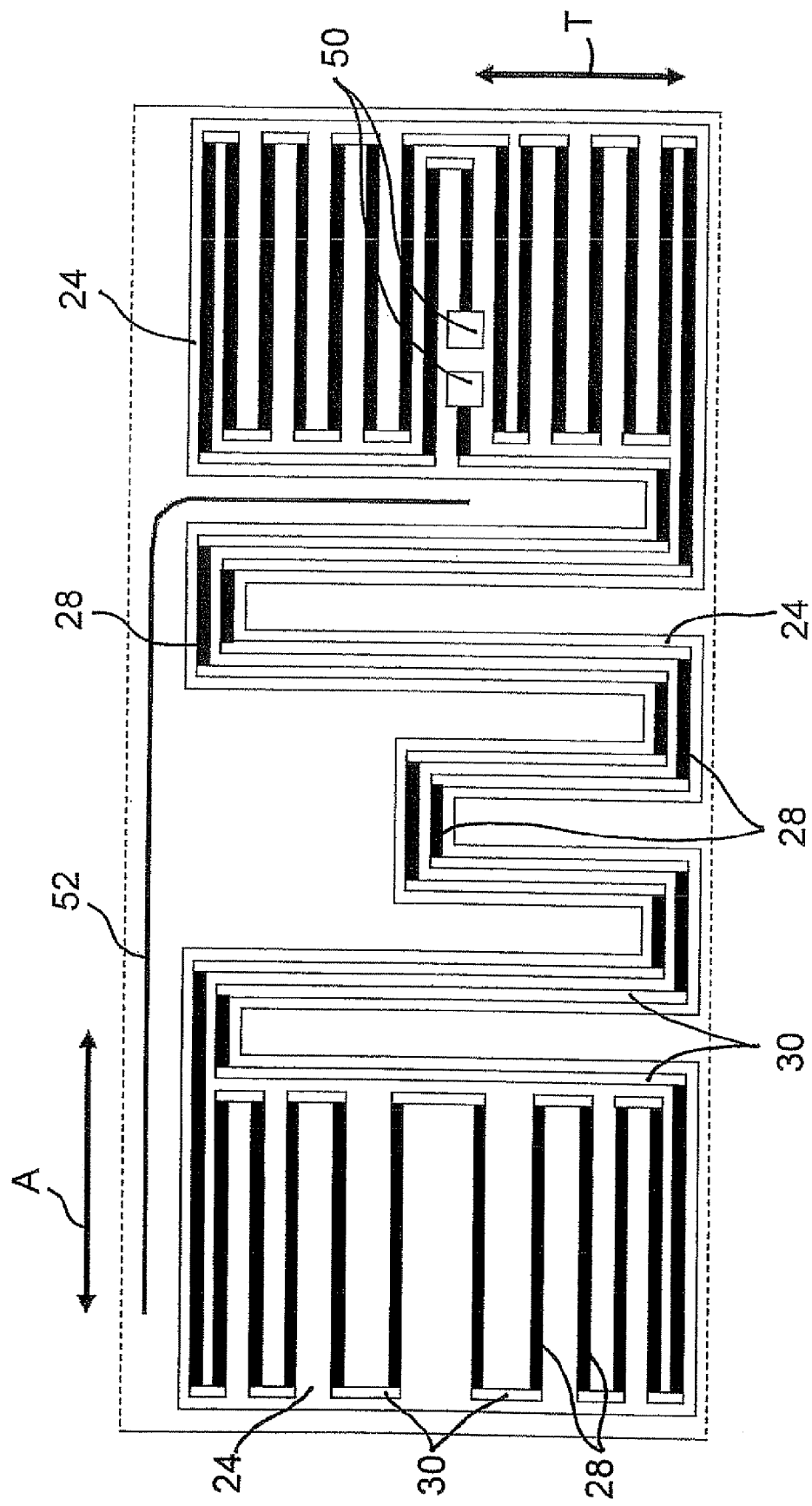
Figure 9:
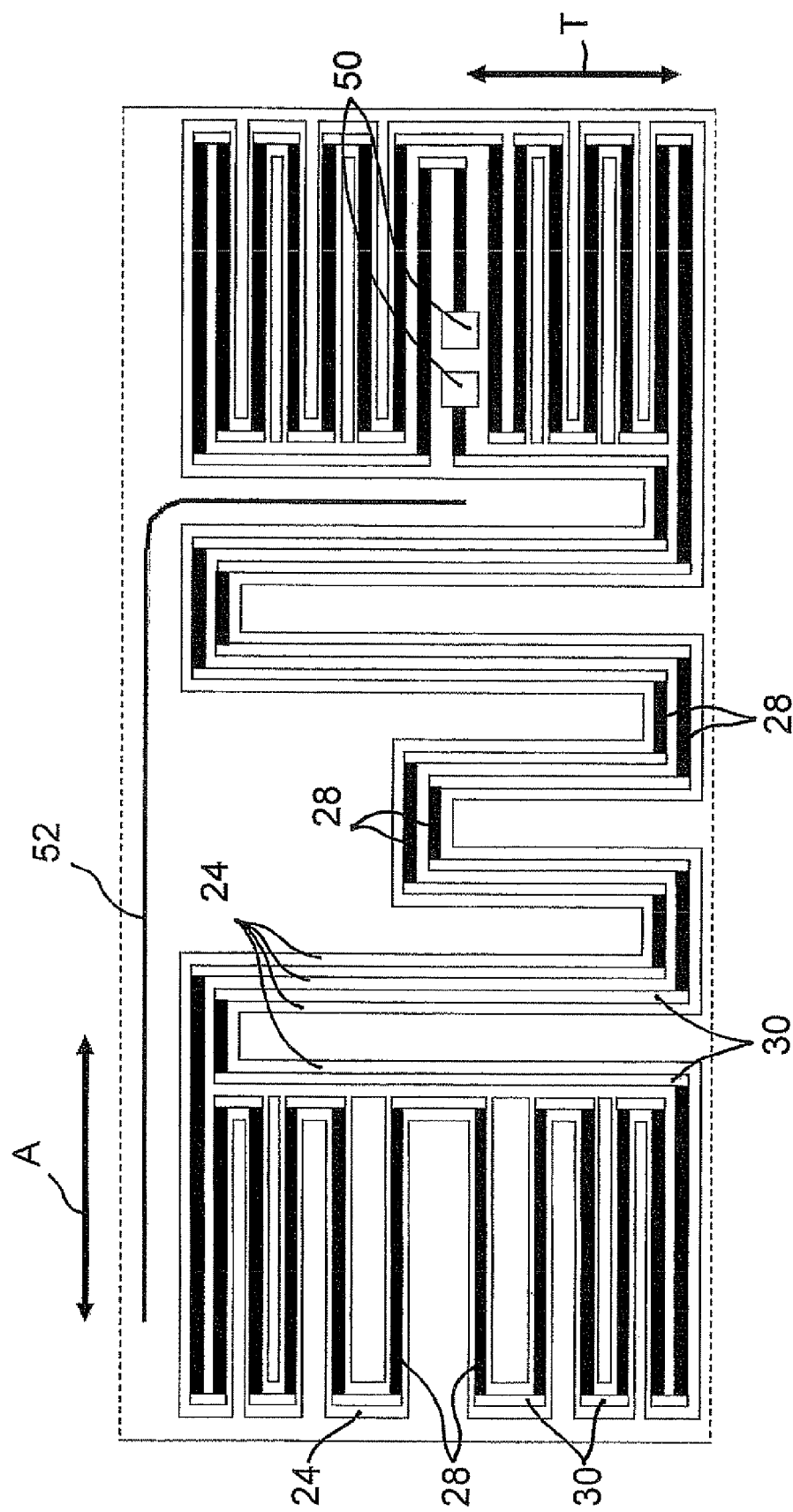

FIG. 1 shows a schematic cross-sectional view of a hot runner nozzle fitted with an electrical heater of the present invention, FIGS. 2-4 are schematic views elucidating the loads incurred in the hot runner nozzle of FIG. 1 when operating, FIG. 5 is a schematic view of a first design variation of the electric heater of the invention, FIGS. 6-7 are schematic views of diverse variations of transition sites between heating conductor tracks and electric conductor tracks, FIG. 8 is a schematic view of a second design variation of the electric heater of the invention, and FIG. 9 shows a third design variation of the heater of the invention.

Identical or similar components discussed below are denoted by identical reference numerals.

FIG. 1 is a schematic, sectional view of one embodiment mode of a hot runner nozzle 10 of the present invention. As a component of injection molding equipment used process thermoplasts, said hot runner duct nozzle comprises an omitted housing for affixation to a manifold, also omitted, and said housing receiving a substantially cylindrical feed pipe 12. A base 14 integral with this feed pipe 12 ends flush with the housing and rests in sealing manner against the manifold. A terminal nozzle tip 16 is inserted, preferably screwed into the feed pipe 12 that runs axially and extends the flow duct 18 subtended in the feed pipe 12 as far as the omitted plane of a mold nest (also omitted). Said nozzle tip 16 also may be made integrally with the feed pipe 12 and be operating in the same manner.

A heater 22 is mounted on the periphery of the wall 20 of the feed pipe 12 which is made of steel. This heater 22 is designed as a flat layer heater comprising a dielectric layer 24 mounted directly on the metal and acting as an insulating layer, further a heating layer 26 which is mounted thereon and which, as schematically indicated in FIG. 1, is fitted with heating conductor tracks 28 and electrical conductor tracks 30, also with an outer cover layer 32 shielding from the ambience the heating conductor tracks 28, the electrical conductor tracks 30 and the dielectric layer 24 and electrically insulating them. In this design the heating conductor tracks 28 run substantially in the axial direction of the feed pipe 12 whereas the electrical conductor tracks 30 run substantially tangentially, that is, in the peripheral direction, in a manner elucidated further below in relation to FIGS. 5, 8 and 9. The more precise configuration of the heating conductor tracks 28 in the axial direction may be controlled arbitrarily to meet the locally required heat input. In this manner a defined temperature distribution can be attained within the feed pipe 12.

The reasons for configuring the heating conductor tracks 28 in the axial direction and the electrical conductor tracks 30 in the tangential direction are elucidated as follows in relation to FIGS. 2 through 4.

On account of the internal pressure in the feed pipe 12, the hot runner nozzle 10 shown in FIG. 1 will expand during injection molding. Such expansion also is transmitted to the dielectric layer 24, to the heating layer 26 and to the heating conductor tracks 28 and electrical conductor tracks 30 mounted on said dielectric layer 24, and to the sheath 32.

The tensive forces generated in the tangential and axial directions by said expansion in the layers configured on the feed pipe may be compared also to the stresses on the weld seams of a pressurized water boiler. Such a boiler is shown in FIG. 2 and denoted overall by 40, a longitudinal seam 42 being schematically indicated running in the tangential direction T and a circular seam 44 being shown running in the axial direction A. From the boiler formula, the tensions in a welded longitudinal seam 42 (tension orthogonal to the longitudinal seam 42 in the tangential direction T) is twice as large as that in a welded circular seam 44 (tension orthogonal to the circular seam 44 in the axial direction A). In other words, circular seams 44 respectively the heating conductor tracks constituted in the tangential direction T will be loaded mechanically much more and therefore are exposed to accelerated ageing and hence to premature failure.

When additionally considering the thermal effects of said expansion on the heating layer 26, then the expansion of the feed pipe 12 elongates a heating conductor track running in the circumferential respectively tangential direction T relative to an axially running heating conductor track, entailing a higher electric resistance of the said tangential heating conductor track and accordingly a higher voltage drop and higher power. Therefore a tangential heating conductor track is heated more highly and its temperature is commensurately raised higher too. Moreover said expansion may entail some transverse micro-restructuring in the heating conductor track in turn leading to increased electric resistance and hence local heating accelerating the fatigue of the heating layer 26.

Another difference between the heating conductor tracks running tangentially and those running axially is that varying forces act on the dielectric layer 24 in the tangential direction T in the direction of thickness, whereas the axial forces remain nearly constant with respect to thickness, as indicated schematically in FIGS. 3 and 4.

In order to meet the above operational states of the heating layer 26 during an injection molding procedure, the heating conductor tracks 28—namely those tracks actively contributing to heating the feed pipe 12—are arrayed in the axial direction A and accordingly shall be only under minor load. The heating conductor tracks 28 running in the axial direction A are connected to one another by electrical conductor tracks 30 running substantially in the tangential direction T and being required to withstand relatively larger loads. However the electrical conductor tracks 30 present less electrical resistance than the heating conductor tracks 28 and accordingly they are only slightly heated during injection molding. Said tracks 30 only contribute slightly to heating the feed pipe 12. Said lesser electrical resistance may be implemented selecting a material of lower resistivity and/or enlarging the cross-section of the conductor tracks 30 beyond that of the heating conductor tracks 28.

Because of the low electrical resistance of said tracks 30, the thermal effect on them is substantially lowered and as a result the above discussed difficulties of higher temperature and possibly of transverse micro-crack formation are precluded, thus offering a countermeasure to premature failure of the heating layer 26.

FIG. 5 is a geometrically developed representation of one embodiment mode of a heating layer 26 of the hot runner nozzle 10 of the present invention. In this embodiment mode, the dielectric layer 24 runs over the entire feed pipe 12 (omitted from FIG. 5). A plurality of heating conductor tracks 28 are configured in the axial direction A on said dielectric layer 24 and are fed with electric power by means of connection pads 50. Seen in topview, the connection pads 50 are square, the transition sites between the heating conductor tracks 28 and the connection pads 50 being made as straight and orthogonal as practical to attain a practically quasi-homogeneous power distribution. Alternatively the connection pads 50 also assume different shapes, for instance being rounded though preferably roundings shall be absent in the transition site between a connection pad 50 and a heating conductor track 28.

The heating conductor tracks 28 serving to heat the feed pipe 12 are distributed in application-specific manner corresponding to the local heat demand across the dielectric layer 24. To attain homogeneous heat distribution, the spacings between the heating conductor tracks 28 (left and right in FIG. 5) always increase toward the center because those heat conductor tracks that are enclosed by other heat conductor tracks otherwise would be at a higher temperature on account of the neighboring power supply from the other heating conductor tracks 28.

The individual heating conductor tracks 28 are connected by conductor tracks 30 to one another which in the present case run tangentially. The electric resistance of the conductor tracks 30 is less than that of the heating conductor tracks 28, and accordingly the temperature load applied to the conductor tracks 30 is less than that applied to the heating conductor strips 28. In this manner the above described higher tangential stresses in the direction T acting on the conductor tracks 30 shall be compensated and the service life of said conductor tracks shall be raised. On the other hand, as already described above, the heating conductor tracks 28—running in the axial direction A—incur substantially lower stresses and accordingly the said tracks 28 are unlikely to fail while the hot runner nozzle 10 is operating. The lower electric resistance of the conductor tracks 30 may be attained by these strips being made of a material of lower electrical resistivity and/or by selecting the cross-section of the conductor tracks 30 to be larger than that of the heating conductor tracks 28.

The heating layer 26 comprises also a temperature sensor 52 detecting the temperature of the nozzle tip 16 of the hot runner nozzle 10.

FIGS. 6 and 7 schematically show variations of the transition sites between heating conductor tracks 28 which are parallel to each other and a conductor track 30 connecting them. FIG. 6 schematically shows the current density distribution in the case of the transition sites 54 being configured flush with a line S running in the tangential direction T. As shown, the current density increases toward the inner corner of the transition site because the current follows the path of least resistance. The lower the conductivity of the conductor tracks 30, the higher the relative current density in this zone. This inhomogeneous current distribution in turn may generate "hot spots" in the zones denoted by the dashed circles in FIG. 6 and may cause premature ageing of the heater layer 26.

In order to compensate such inhomogeneous power distribution, the transition sites 54 between the conductor tracks 30 and the heating conductor tracks 28 are configured in the present invention preferably at an angle α oblique to the tangential direction T as shown in FIG. 7. Preferably as a function of the conductivity of the conducting strip the angle α shall be between 0 and 40°. This feature reliably precludes hot spots. Be it borne in mind that the transition sites 54 are not mandatorily straight. Alternatively they also may be curved. The important feature is that the transition sites 54 run constantly from their inner edge outward in the direction of the heating conductor track.

FIG. 8 is a schematic view of a further embodiment mode of a heating layer 26 of the hot runner nozzle 10 of the invention. This embodiment mode differs from that of FIG. 5 in that the dielectric layer 24 is not deposited on the entire feed pipe 12 of the hot runner nozzle, instead only on corresponding areas below the heating conductor tracks 28 and the conductor tracks 30. This design allows saving on material used in making said dielectric layer. Also, depending on the manufacturing procedure of the dielectric layer 24, the processing time may be shortened.

A further embodiment mode of a heating layer 26 of the hot runner nozzle of the present invention is schematically shown in FIG. 9. This embodiment mode differs from that of FIG. 8 in that the dielectric layer 24 entirely follows the path of the heating conductor tracks 28 and of the conductor tracks 30, in the present case the width of the dielectric layer 24 being twice that of the heating conductor layer 28 and the conductor tracks 30. The design of the dielectric layer 24 of FIG. 9 further saves material and may reduce further the processing time when manufacturing it.

Be it borne in mind that the above embodiment modes of the present invention are not limitative. Instead, modifications and changes may be introduced without thereby transcending the scope of the present invention as defined in the appended claims.

In particular the heater 22 of FIG. 1 may be separate from the feed pipe 12. Illustratively, in that case the dielectric layer 24 may be a sleeve, in particular in the form of a ceramic tube, the heating conductor tracks 28, the conductor tracks 30 and the sheath 32 then being deposited on said sleeve.

Moreover, direct coating may be used to deposit the heating conductor tracks 28, the conductor tracks 30 and the sheath 32.

In another embodiment mode of the present invention, the insulating tracks of the insulating layer 24 are inserted in those of the support respectively the feed pipe 12, as a result of which the heater substantially terminates flush with the feed pipe 12. For that purpose said feed pipe is fitted with omitted grooves.

In yet another embodiment mode of the present invention, the conductor tracks 30 may be wire segments deposited circumferentially on the support 12 respectively on the insulating layer 24 and soldered in place between the heating conductor tracks 28.

All features and advantages, inclusive design details, spatial configurations and procedural steps, that are explicit and implicit in the claims, specification and the drawings, may be construed being inventive per se or in arbitrary combinations.

LIST OF REFERENCES 10 hot runner nozzle
12 feed pipe
14 base
16 nozzle tip
18 flow duct
20 wall
22 heater
24 dielectric layer
26 heating layer
28 heating conductor tracks
30 conductor tracks
32 sheath
40 boiler
42 longitudinal weld
44 circular weld
50 connection pads
52 temperature sensor
54 transition site
A axial direction
α angle
T tangential direction
S line of alignment

The invention claimed is:

1. Electric heater (22) to heat substantially cylindrical objects (12), in particular hot runner nozzles (10) of hot runner systems, comprising at least one cylindrical support and at least one heating conductor track (28) mounted on said support (12),
characterized
in that each heating conductor track (28) essentially runs in the axial direction (A) of the support 12, in that the heating conductor tracks (28) are electrically connected to each other by conductor tracks (30), each track (30) essentially running in the tangential direction (T) of the support (12), and in that the conductor tracks (30) present a lower electrical resistance than do the heating conductor tracks (28).

2. Heater (22) as claimed in claim 1, characterized in that the conductor tracks (30) are made of a material of a lesser resistivity than that of the heating conductor tracks (28).

3. Heater (22) as claimed in claim 1, characterized in that the cross-section of the conductor tracks (30) is larger than that of the heating conductor tracks (28).

4. Heater as claimed in claim 3, characterized in that the transition sites (54) between the heating conductor tracks and the conductor tracks (30) obliquely subtend an angle (α) with the axial direction (A).

5. Heater (22) as claimed in claim 4, characterized in that the angle (α) is between 0 and 90, preferably between 0 and 40°.

6. Heater (22) as claimed in claim 1, characterized in that the particular spacing between mutually neighboring heating conductor tracks (28) is selected in a manner that in order to attain homogeneous heat distribution in the object to be heated (12), the distribution of the applied power is inhomogeneous.

7. Heater (22) as claimed in claim 1, characterized by being fitted with connection pads (50) for the heating conductor tracks (28).

8. Heater (22) as claimed in claim 7, characterized in that the transition sites between the heating conductor tracks (28) and connection pads (50) run orthogonally to the axial direction (A).

9. Heater (22) as claimed in claim 1, characterized in that the support is tubular.

10. Heater (22) as claimed in claim 1, characterized in that the support forms, or is, a feed pipe (12).

11. Heater (22) as claimed in claim 1, characterized in that the support is made of a metallic or ceramic material.

12. Heater (22) as claimed in claim 1, characterized in that at least one insulating layer (24) is deposited on the support.

13. Heater (22) as claimed in claim 12, characterized in that the insulation layer (24) runs within bands underneath the heating conductor tracks (28) and the conductor tracks (30).

14. Heater (22) as claimed in claim 12, characterized in that the width of the insulating layer is larger than that of the heating conductor tracks (28) and the width of the conductor track (30).

15. Heater (22) as clamed in claim 12, characterized in that the insulating bands are firmly bonded on the support.

16. Heater (22) as claimed in claim 12, characterized in that the heating conductor tracks (28) and the conductor tracks (30) are deposited to firmly bond with the insulating strips.

17. Heater (22) as claimed in claim 12, characterized in that the heating conductor tracks (28), the conductor tracks (30) and/or the insulating layer (24) respectively the insulating layers are deposited on the support using the thick film technique or by laser sintering.

18. Heater (22) as claimed in claim 12, characterized in that the insulating layer (24) is a dielectric layer.

19. Heater as claimed in claim 1, characterized in that it comprises a temperature sensor (52).

20. Heater (22) as claimed in claim 19, characterized in that the temperature (52) does not run across the heating conductor tracks (28) and/or the conductor tracks (30).

21. Hot runner nozzle (10) fitted with a heater defined in claim 1.

22. Injection molding equipment comprising at least one hot runner nozzle (10) defined in claim 21.

* * * * *